(12) United States Patent
Schuele et al.

(10) Patent No.: US 8,890,853 B2
(45) Date of Patent: Nov. 18, 2014

(54) IN-PIXEL ULTRASONIC TOUCH SENSOR FOR DISPLAY APPLICATIONS

(71) Applicant: Sharp Laboratories of America, Inc., Camas, WA (US)

(72) Inventors: Paul Schuele, Washougal, WA (US); Themistokles Afentakis, Camas, WA (US); John Hartzell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 8 days.

(21) Appl. No.: 13/740,043

(22) Filed: Jan. 11, 2013

(65) Prior Publication Data

US 2014/0198072 A1 Jul. 17, 2014

(51) Int. Cl.
*G06F 3/043* (2006.01)
*G06F 3/044* (2006.01)

(52) U.S. Cl.
CPC ..................................... *G06F 3/044* (2013.01)
USPC .......................................... 345/177; 345/173

(58) Field of Classification Search
CPC ..... G06F 3/043; G06F 3/0433; G06F 3/0436; G06F 3/044; G06F 3/045
USPC ................................................. 345/173, 177
See application file for complete search history.

(56) References Cited

U.S. PATENT DOCUMENTS

| 5,122,993 | A | * | 6/1992 | Hikita et al. | 367/155 |
|---|---|---|---|---|---|
| 6,633,280 | B1 | | 10/2003 | Matsumoto et al. | |
| 7,489,304 | B2 | | 2/2009 | Nakazawa et al. | |
| 7,739,912 | B2 | | 6/2010 | Schneider et al. | |
| 7,893,474 | B2 | | 2/2011 | So et al. | |
| 7,955,641 | B2 | | 6/2011 | Schneider et al. | |
| 8,139,827 | B2 | | 3/2012 | Schneider et al. | |
| 8,201,739 | B2 | | 6/2012 | Schneider et al. | |
| 8,581,865 | B2 | * | 11/2013 | Choo et al. | 345/173 |
| 2007/0200835 | A1 | | 8/2007 | Choo et al. | |
| 2008/0030483 | A1 | | 2/2008 | Choo et al. | |
| 2011/0107593 | A1 | | 5/2011 | Choo et al. | |
| 2012/0206585 | A1 | | 8/2012 | Schneider et al. | |
| 2013/0201134 | A1 | * | 8/2013 | Schneider et al. | 345/173 |

FOREIGN PATENT DOCUMENTS

| JP | 2012/039372 | 2/2012 |
|---|---|---|
| JP | 2012/226687 | 11/2012 |
| WO | WO 2010/026395 | 11/2010 |

OTHER PUBLICATIONS

U.S. Appl. No. 61/594,330, Schneider et al.
Walker, Geoff. "A Review of Technologies for Sensing Contact Location on the Surface of a Display." Journal of the Society for Information Display 20, No. 8 (2012): 413-440.
Cardoso et al., "Micro and Nanofilms of Poly(vinylidene Fluoride) . . . Actuator Applications", Smart Materials and Structures 20, No. 8 (Aug. 2011): 087002. doi:10.1088/09.

* cited by examiner

*Primary Examiner* — Kevin M Nguyen
(74) *Attorney, Agent, or Firm* — Law office of Gerald Maliszewski; Gerald Maliszewski

(57) ABSTRACT

A video display is provided with a planar piezoelectric transmitter to transmit ultrasound signals, and a display panel including a plurality of pixels. Each pixel has a data interface to accept a video signal with a variable voltage associated with a range of light intensity values, and to supply a touch signal with a variable voltage derived from a range of reflected ultrasound signal energies. Each pixel is made up of a light device to supply light with an intensity responsive to the video signal voltage, and a storage capacitor to maintain a video signal voltage between refresh cycles. A piezoelectric transducer accepts a reflected ultrasound signal energy and maintains a touch signal voltage between refresh cycles. In one aspect, the storage capacitor and the piezoelectric transducer are the same device. The light device may be a liquid crystal (LC) layer or a light emitting diode.

27 Claims, 17 Drawing Sheets

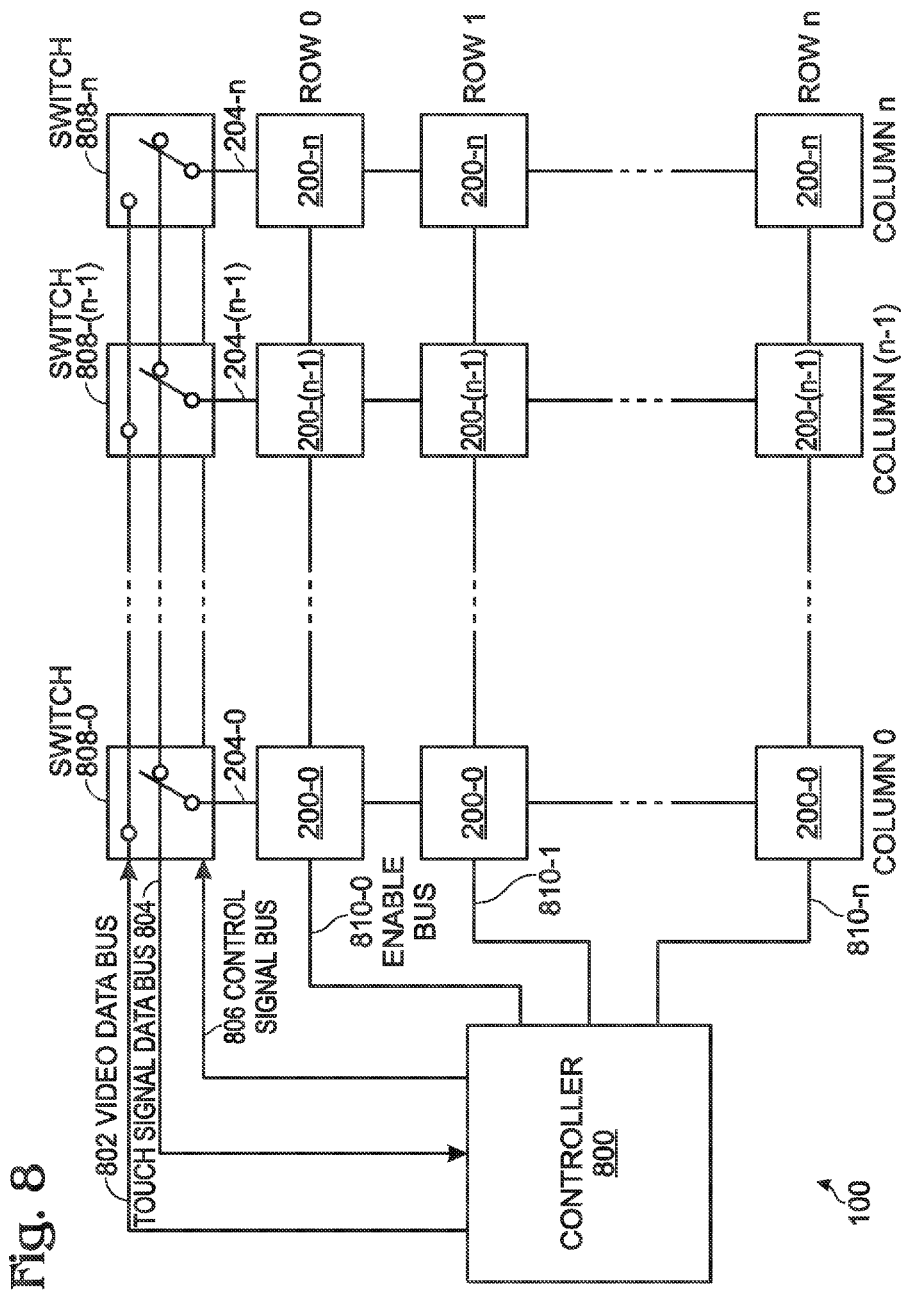

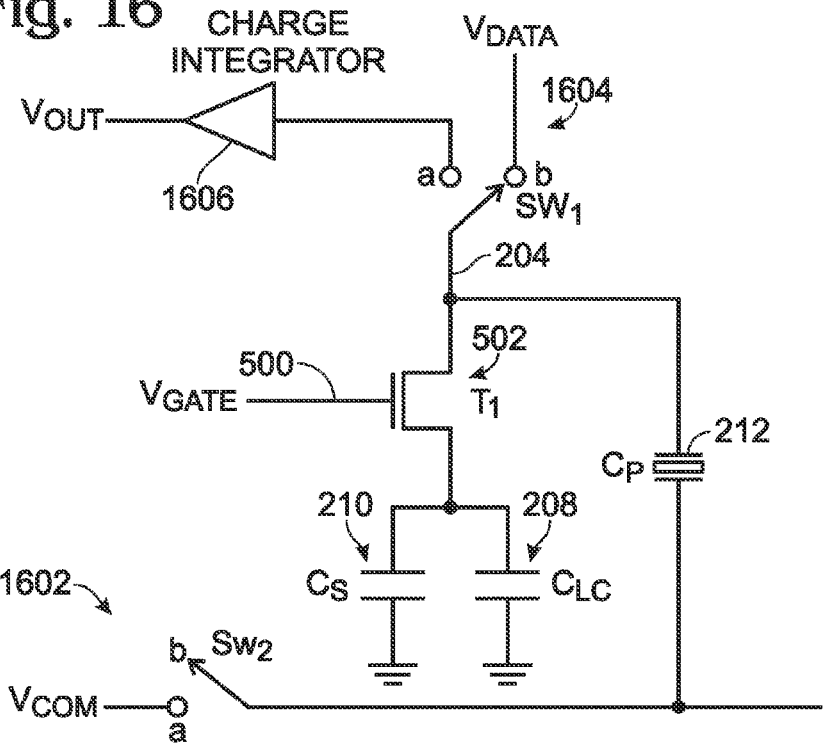
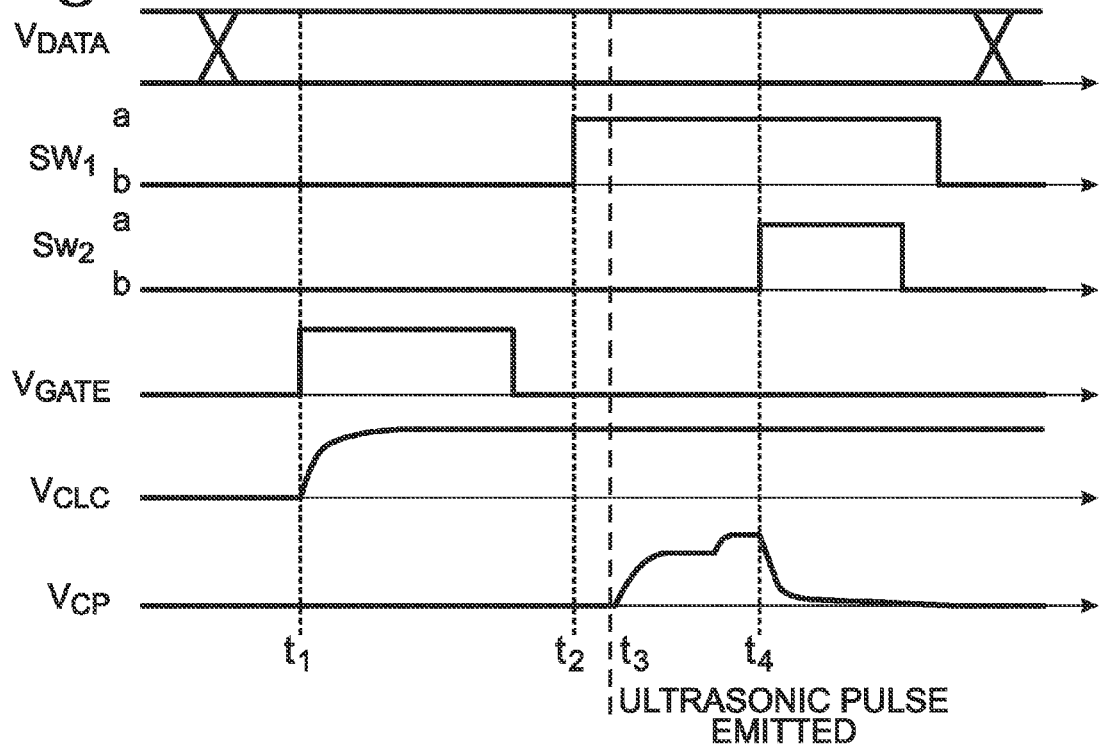

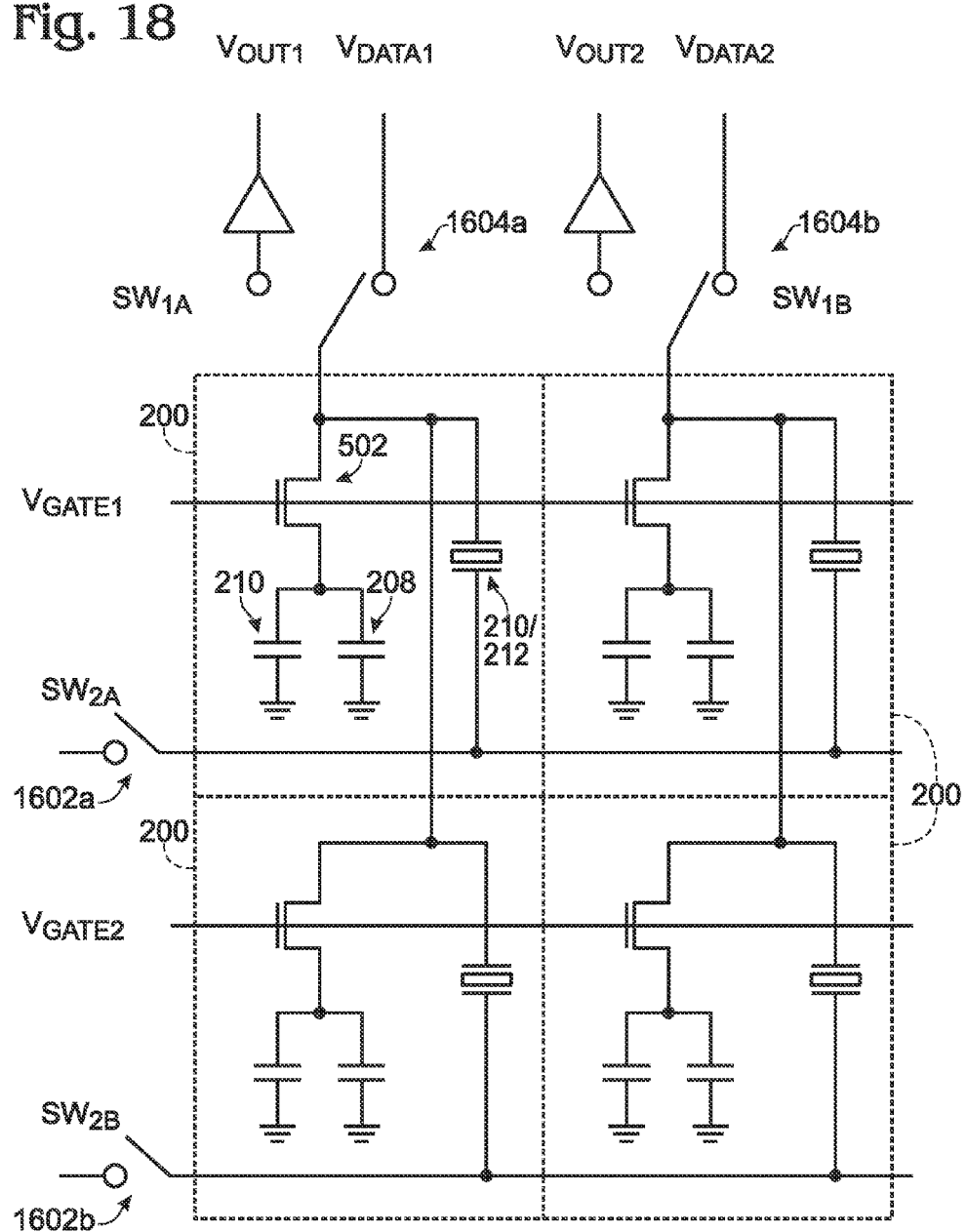

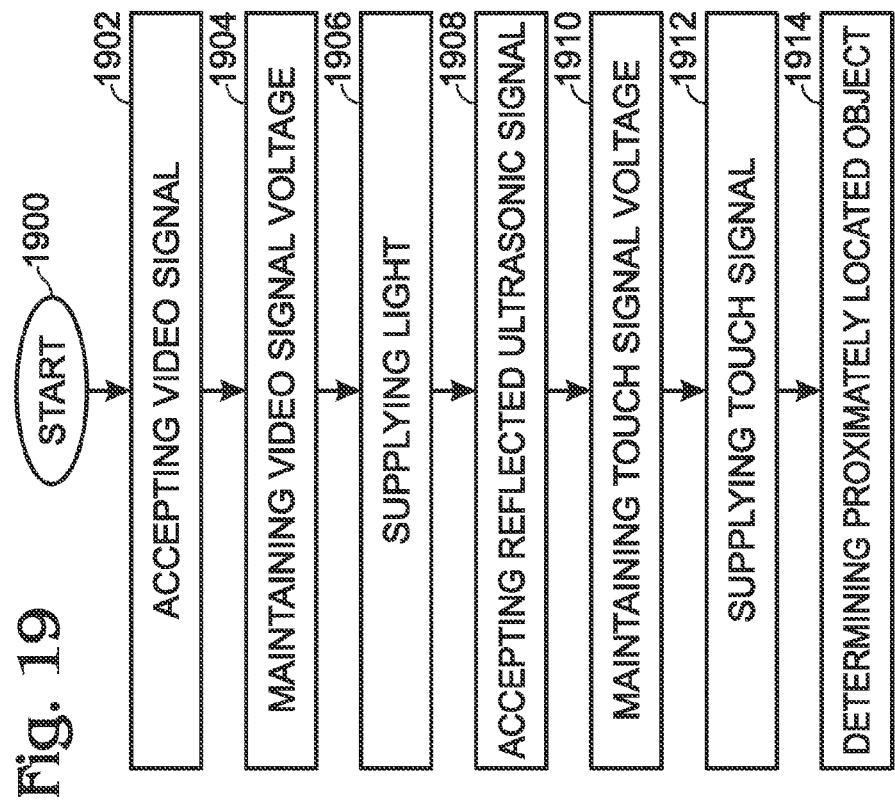

IN-PIXEL ULTRASONIC TOUCH SENSOR FOR DISPLAY APPLICATIONS

BACKGROUND OF THE INVENTION

1. Field of the Invention

This invention generally relates to image display technology and, more particularly, to ultrasonic wavelength touch sensors that are fabricated as an integral part of the display pixels.

2. Description of the Related Art

There are many available touch sensor technologies, but the market is currently dominated by two technologies. Low cost systems that do not need multi-touch capability often use resistive touch, which measures the resistance of a conductive network that is deformed by touch creating a connection between X and Y bus lines. The most commonly used multi-touch sensing technology, which is referred to as projected capacitive, measures the capacitance between each pair of electrodes in a cross point array. The capacitance of a finger close to the sensor changes the mutual capacitance at that point in the array. Both of these technologies are fabricated independently of the display and are attached to the front of the display causing additional cost, complexity, and some loss of light due to absorption.

FIG. 21 is a partial cross-sectional view of a liquid crystal display (LCD) panel with a projective capacitance touch sensor (prior art). A liquid crystal display with a touch panel, such as is used for cell phones, typically consists of multiple modules as shown schematically in the figure. From back to front the modules are backlight, thin film transistor (TFT) backplane, color filter, and touch panel. In practice, the TFT backplane and color filter glass are assembled and the cavity between is filled with liquid crystal material. Then, the touch panel and backlight are attached to the front and back surfaces respectively. It is clear that if a touch screen technology could be integrated into the TFT layer, a decrease in cost, thickness, and weight of the display stack could be realized by removing the touch panel module from the assembly.

FIGS. 22A and 22B are schematic and timing diagrams, respectively, for an LCD display TFT backplane (prior art). A display backplane consists of an array of thin-film transistors that are used to control access to each individual pixel as shown in FIG. 22A. At each pixel a transparent electrode controls the voltage applied across the liquid crystal material (LC) changing the properties of the LC, which in turn affects the polarization of the light transmitted through the LC cell. Thus, the intensity of the light displayed to a viewer depends on the angle between the polarization established by the LC cell and the top polarizer. Because the capacitance of the LC cell is low, there is also a storage capacitor (Cs) made with two electrodes separated by a dielectric to maintain the voltage between successive refresh cycles. The timing diagram shows one refresh cycle, consisting of setting the LC voltage of each pixel by the following steps:

1) Turn on (enable) the transistor gate for the first row (signal R1);
2) Set the video voltage on each data line (D1 to Dn) with respect to the reference voltage Vcon;
3) Wait for the voltage at the nodes V11 to V1n in to reach the set voltage;
4) Turn off the transistor gate for the first row of pixels to isolate the storage node; and,
5) Repeat Steps 1 to 4 sequentially for each row.

FIG. 23A is a schematic and FIG. 23B depicts two possible circuit layouts associated with the schematic (prior art). Many alternate TFT technologies have been used to fabricate LCD pixels including amorphous silicon (a-Si), poly Si, and indium gallium zinc oxide (IGZO). The storage capacitor Cs can be realized with a separate conductive bus line (left layout) or using the adjacent gate (enable) line (R1). In both cases the storage capacitor is formed by depositing a dielectric layer such as $SiO_2$ or a polyimide between a bottom electrode (Gate or Vcon busline) and the LC pixel electrode usually formed of ITO.

It would be advantageous if a display could be fabricated that was sensitive to touch, without extra layers of circuitry that increase the complexity and diminish the luminescence of the display.

SUMMARY OF THE INVENTION

Disclosed herein is an ultrasonic sensor structure that can be integrated into a display, such as a liquid crystal display (LCD) or organic light emitting device (OLED) panel, to make a touch sensor. The sensor detects any object touching the surface of the display by measuring the amount of ultrasonic energy absorbed at each pixel. In one aspect, a thin film piezoelectric sensor is embedded in each display pixel storage capacitor to sense the presence of an object (such as a finger or stylus) touching the front surface of a display panel by measuring the amount of ultrasonic energy absorbed by the object.

Ultrasonic sensor technology has several advantages over existing technologies for touch screen applications. The object used to interact with the touch sensor can be essentially anything that absorbs ultrasonic energy. Unlike current touch screen technology using capacitive sensing, the ultrasonic sensor can detect a metal stylus, a calligraphy brush, a pencil point, or a gloved finger. The touch sensor is integrated in the display, so that the added cost of a touch sensor substrate, and the attachment of the sensor to the display is removed. The sensing is enabled using existing display backplane circuits so that the only additional processing required is for the addition of the piezoelectric material in the pixel storage capacitor. Because the sensors are integrated in each display pixel, touch resolution is inherently that of the display, and touch location is directly mapped to pixel location.

Accordingly, a video display is provided with a planar piezoelectric transmitter to transmit ultrasound signals and a display panel including a plurality of pixels. Each pixel has a data interface to accept a video signal with a variable voltage associated with a range of light intensity values, and to supply a touch signal with a variable voltage derived from a range of reflected ultrasound signal energies. Each pixel is made up of a light device to supply light with an intensity responsive to the video signal voltage, and a storage capacitor to maintain a video signal voltage between refresh cycles. A piezoelectric transducer accepts reflected ultrasound signal energy and maintains a touch signal voltage between refresh cycles.

In one aspect, the storage capacitor and the piezoelectric transducer are the same device. Thus, the piezoelectric transducer/storage capacitor is made up of a conductive bottom electrode, a piezoelectric layer overlying the conductive bottom electrode, and a transparent conductive top electrode overlying the piezoelectric layer. For example, the light device may be a liquid crystal (LC) layer interposed between electrodes to control the transmission of light from an underlying backlight. In that case, the piezoelectric transducer/storage capacitor top electrode and a control electrode of the light device are the same electrode. Alternatively, the light device may be an LED.

Additional details of the display, and a method for operating a touch-sensitive video display pixel, are provided below.

BRIEF DESCRIPTION OF THE DRAWINGS

FIG. 8 is a schematic block diagram depicting another aspect of the display.

FIG. 16 is a schematic diagram of a variation to the pixel design presented in FIG. 13.

FIG. 17 is a timing diagram associated with the circuit of FIG. 16.

FIG. 18 is a diagram depicting an exemplary integration of the circuit of FIG. 17 into an LCD display.

FIG. 19 is a flowchart illustrating a method for operating a touch sensitive video display pixel.

FIG. 20 is a flowchart illustrating a method for operating a touch-sensitive video display.

DETAILED DESCRIPTION

Figure 1:
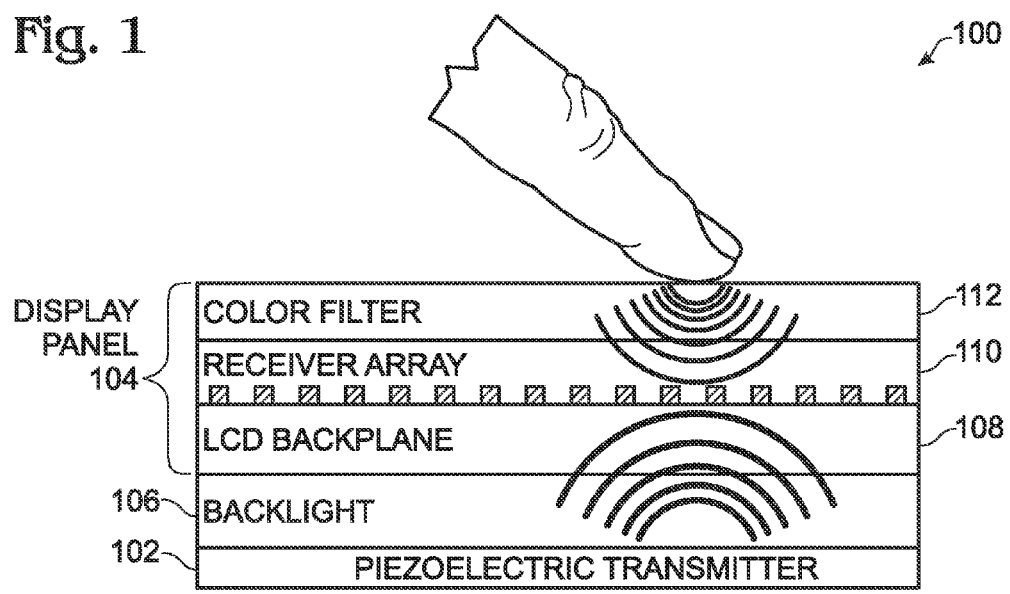
FIG. 1 is a schematic drawing depicting a planar piezoelectric transducer transmitting an ultrasonic pulse through an exemplary liquid crystal display (LCD) display.

FIG. 1 is a schematic drawing depicting a planar piezoelectric transducer transmitting an ultrasonic pulse through an exemplary liquid crystal display (LCD) display. The display 100 consists of an ultrasonic transmitter 102 and a display panel 104. In this example, the display 100 includes a backlight 106, and the display panel 104 includes an LCD backplane 108 that also incorporates an array of piezoelectric receivers 110 and a color filter layer 112. As explained in more detail below, each receiver array element is incorporated into a corresponding pixel. The ultrasonic pulse is reflected from the front surface of the display because of the large difference in density between air and the color filter glass. However, if an object with a density greater than air, such as a fingertip, stylus, or a calligraphy brush touches the display front surface, more ultrasonic energy is absorbed by the object and the reflected ultrasonic energy is weaker. Thus, the piezoelectric response at each display pixel is related to the density of the material touching the color filter glass at each point, and that signal can be used to map the position of objects touching the display. As explained in more detail below, the system presented herein is not limited to an LCD or backlit type of display.

Figure 2:
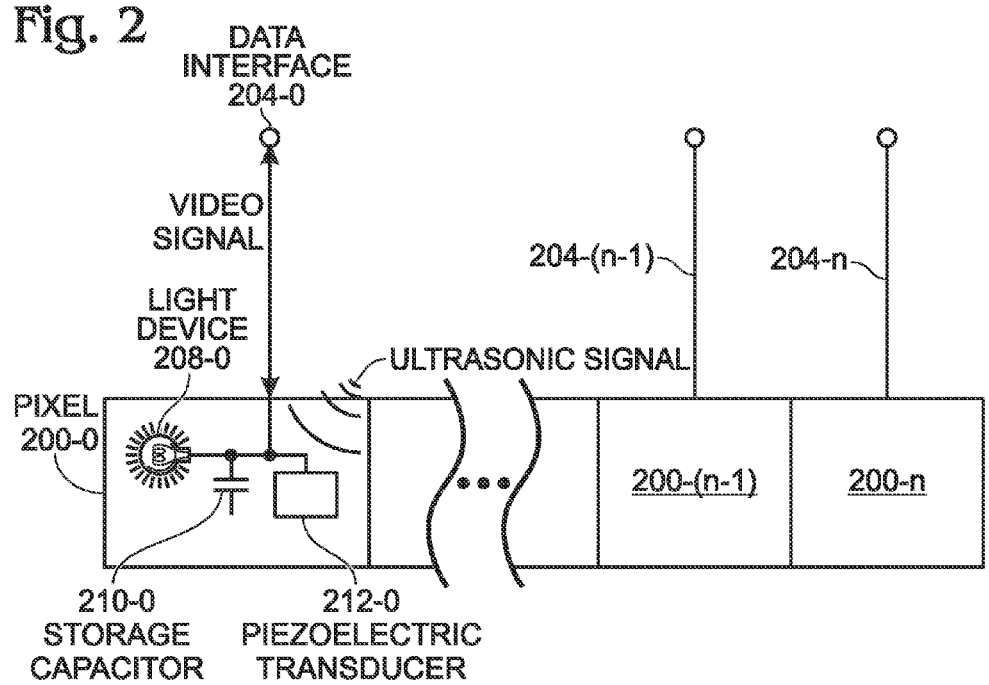
FIG. 2 is a schematic block diagram depicting a portion of the display panel with a plurality of pixels.

FIG. 2 is a schematic block diagram depicting a portion of the display panel with a plurality of pixels. Each pixel 200 (pixels 200-0 through 200-n are shown) has a data interface on line 204 periodically enabled to accept a video signal with a variable voltage associated with a range of light intensity values, and periodically enabled to supply a touch signal with a variable voltage derived from a range of reflected ultrasound signal energies. Each pixel, as represented by pixel 200-0, comprises a light device 208 to supply light with an intensity responsive to the video signal voltage on line 204, and a storage capacitor 210 to maintain a video signal voltage for a first period of time between refresh cycles. A piezoelectric transducer 212 accepts reflected ultrasound signal with a variable energy and maintains a touch signal voltage between refresh cycles.

Figure 3:
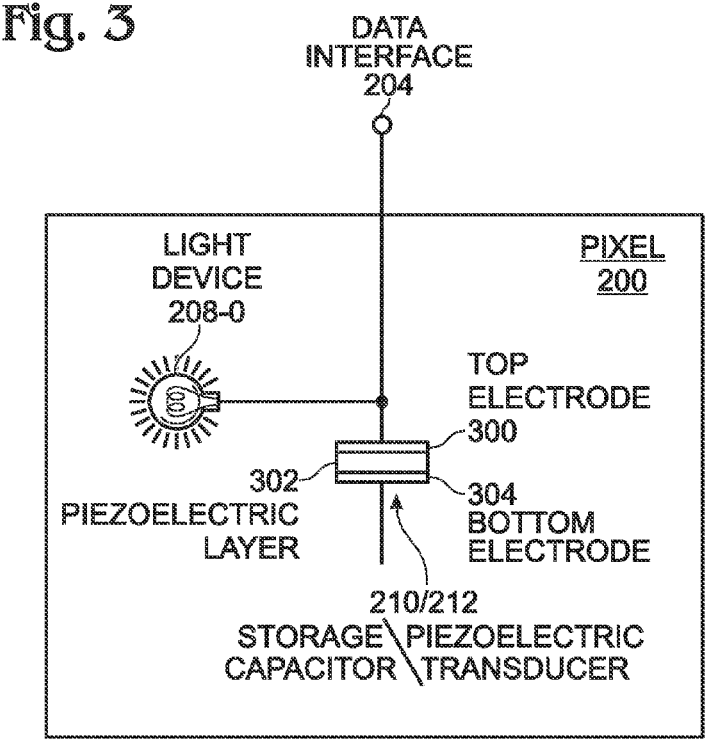
FIG. 3 is a schematic view of a first aspect of a display panel pixel.

FIG. 3 is a schematic view of a first aspect of a display panel pixel. In this aspect, the storage capacitor and the piezoelectric transducer 210/212 are the same device. The piezoelectric transducer/storage capacitor 210/212 comprises a conductive bottom electrode 304, a piezoelectric layer 302 overlying the conductive bottom electrode 304, and a transparent conductive top electrode 300 overlying the piezoelectric layer 302. The piezoelectric layer 302 may be a co-polymer of polyvinylidenefluoride or trifluoroethylene (PVDF-TrFE), and PVDF. However, other materials may also be used.

Figure 4:
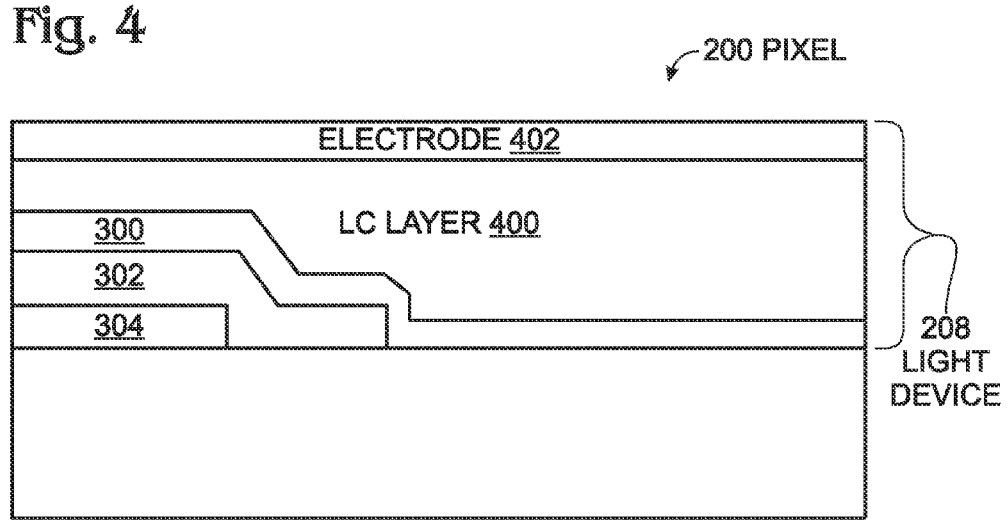
FIG. 4 is a partial cross-sectional view of a first variation of the display panel pixel of FIG. 3.

FIG. 4 is a partial cross-sectional view of a first variation of the display panel pixel of FIG. 3. In this aspect, the light device 208 is a liquid crystal (LC) layer 400 interposed between electrodes 402 and 300. That is, the piezoelectric transducer/storage capacitor top electrode 300 and the control electrode of the light device 208 (LC layer) are the same electrode. The use of electrodes to control an LC layer is well known in the art.

Figure 5:
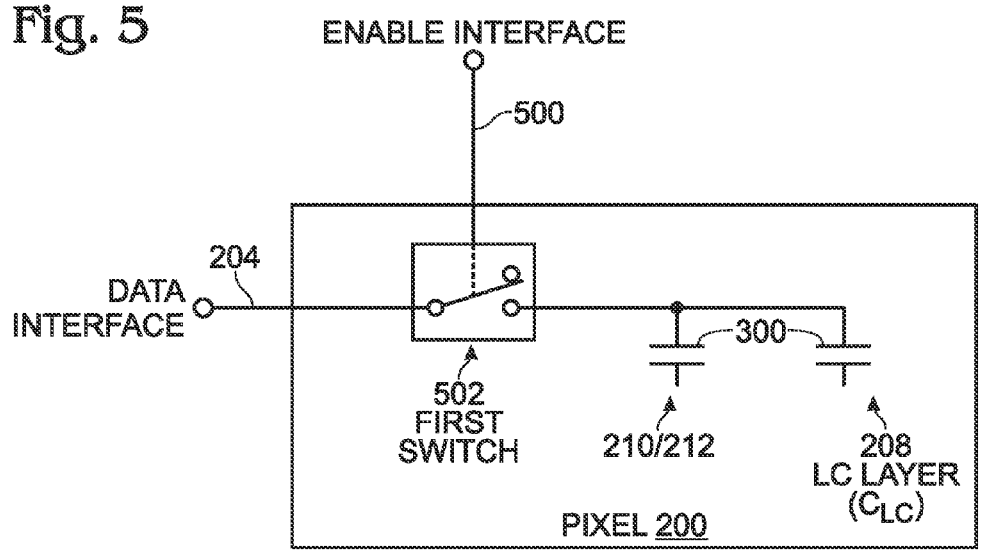
FIG. 5 is a schematic diagram depicting the pixel of FIG. 4 in greater detail.

FIG. 5 is a schematic diagram depicting the pixel of FIG. 4 in greater detail. The pixel 200 further comprises an enable interface on line 500. A first switch 502 has a terminal connected to the data interface on line 204, a terminal connected to the piezoelectric transducer/storage capacitor transparent top electrode 300, and a control port connected to the enable interface on line 500 to selectively enable the first switch. The first switch 502 may be enabled as a single thin film transistor (TFT), multiple transistors, bipolar device, microelectromechanical system (MEMS) crossbar switch, or a TFT with a ferroelectric gate, to name just a few options that would be known by one with skill in the art. The light device is shown as a capacitor ($C_{LC}$), schematically representing an LC layer light device, where the LC layer control electrode and storage capacitor/piezoelectric transducer transparent top electrode 300 are the same electrode.

Figure 6:
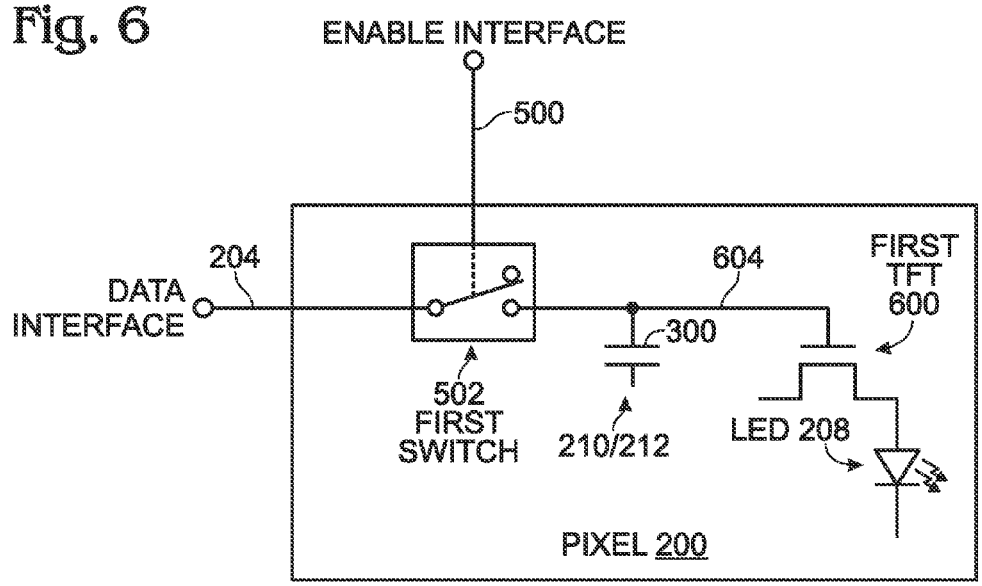
FIG. 6 is a schematic depicting a second variation of display panel pixel of FIG. 3.

FIG. 6 is a schematic depicting a second variation of display panel pixel of FIG. 3. In this aspect, the light device 208 is a light emitting diode (LED). The pixel 200 further comprises an enable interface on line 500. A first switch 502 has a terminal connected to the data interface on line 204, a terminal connected to the storage capacitor/piezoelectric transducer transparent top electrode 300, and a control port connected to the enable interface on line 500, to selectively enable the first switch. A first TFT 600, or similar device, has a gate connected to the terminal of the first switch 502 on line 604, a source, and a drain. As shown in the more detailed drawings that follow, the TFT drain may be connected to an LED drive voltage. The LED 208 has a cathode connected to the source of the first TFT 600. The top electrode 300 of the storage capacitor/piezoelectric transducer 210/212 is connected to line 604.

Figure 7:
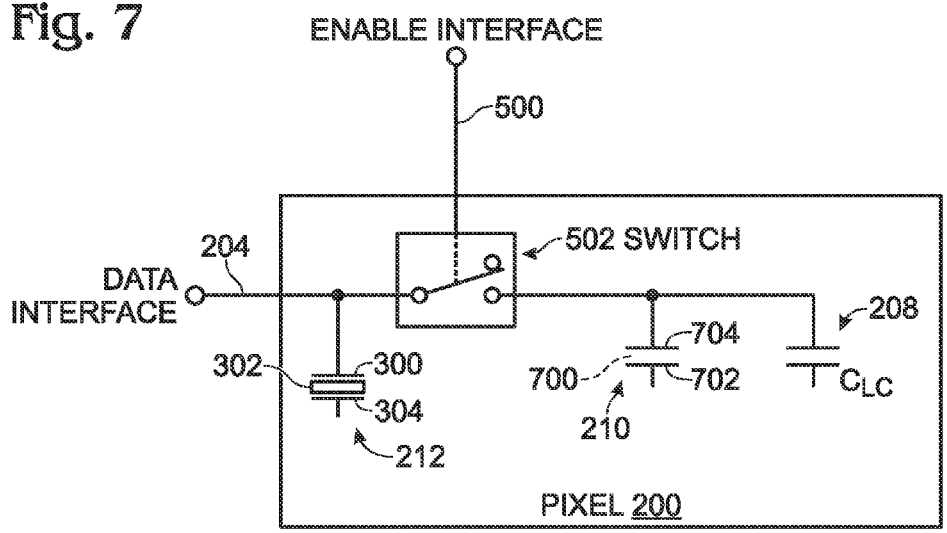
FIG. 7 is a schematic diagram depicting a variation of the display panel of FIG. 2.

FIG. 7 is a schematic diagram depicting a variation of the display panel of FIG. 2. Unlike the examples shown in FIGS. 3 through 6, the storage capacitor and piezoelectric transducer need not necessarily be the same device. In this aspect, the piezoelectric transducer 212 comprises a piezoelectric layer 302 interposed between a bottom electrode 304 and transparent top electrode 300. The storage capacitor 210 comprises a dielectric layer 700 interposed between a bottom electrode 702 and a transparent top electrode 704. The storage capacitor may be a conventional capacitor design. The pixel 200 further comprises an enable interface on line 500. A first switch 502 has a terminal connected to the data interface on line 204 and the piezoelectric transducer transparent top electrode 300, a control port connected to the enable interface on line 500 to selectively enable the first switch, and a terminal connected to the storage capacitor transparent top electrode 704 and light device 208. As shown, the light device is shown as a capacitor, schematically representing an LC layer light device, where the LC layer control electrode and storage capacitor transparent top electrode 704 are the same electrode. Alternatively but not shown, a TFT can be added to the pixel, as shown in FIG. 6, and the light device may be an LED.

FIG. 8 is a schematic block diagram depicting another aspect of the display. The display 100 may further comprise a controller 800 with a video data bus output on line 802 to supply video signals. A touch signal data bus input on line 804 accepts touch signals, and a control signal bus output on line 806 supplies a switch control signal. Also shown is a plurality of switches. Each switch 808 has a first terminal connected to the data interface 204 of a corresponding pixel 200. A second terminal is selectively engagable to either the video data bus output on line 802 or the touch signal data bus input on line 804, in response to a switch control signal. Each switch 808 has a control signal interface connected to the switch control signal bus on line 806.

The controller 800 may further comprise an enable bus output on line 810 connected to the plurality of pixels to supply an enable signal. The data interfaces of the pixels are sequentially enabled by row in response to the enable signals on lines 810-0 through 810-n.

Referring briefly to FIG. 1, the ultrasonic transmitter 102 may be a piezoelectric transducer consisting of a layer of the polymer polyvinylidene fluoride (PVDF) sandwiched between two electrodes. The ultrasonic pulse transmitted through the display stack is a short chirp at a relatively high frequency (e.g. 1-30 MHz) made by applying a high voltage signal (e.g. a sine wave) between the electrodes of the transducer. The transmitter can be positioned at the back of the display as shown, or alternately positioned between the backlight and the back of the LCD backplane.

Each display pixel has a storage capacitor used to set the voltage of the liquid crystal display cell, which in turn controls the intensity of light displayed. A touch sensor receiver is schematically integrated into each pixel by using, for example, a layer of poled copolymer poly[(vinylidenefluoride-co-trifluoroethylene] (PVDF-TrFE) as the dielectric placed between the two transparent conductive electrodes of the storage capacitor. The conductive electrode may be made of indium tin oxide (ITO) or the like. To serve both purposes in the circuit, the storage capacitor (video)voltage is first set to the voltage required for the image to be displayed. Then, the reflected ultrasonic pulse generates a voltage in the piezoelectric sensor that is added to the video voltage. Before the image voltage is reset in the next refresh cycle, the storage capacitor voltage is measured to determine the effect of the reflected ultrasonic pulse. A large generated touch signal voltage corresponds to a high reflected ultrasonic energy (no touch). Lower generated touch signal voltages correspond to the reflected ultrasonic energy being decreased by absorption from object touching the front surface of the display.

In this way the touch sensor is simply incorporated in the existing circuit architecture of LCD or OLED display panels by adding the piezoelectric polymer to the storage capacitor of each display pixel and adding a circuit that measures the voltage on each pixel after sensing an ultrasonic reflection from the display surface.

Figure 9A:
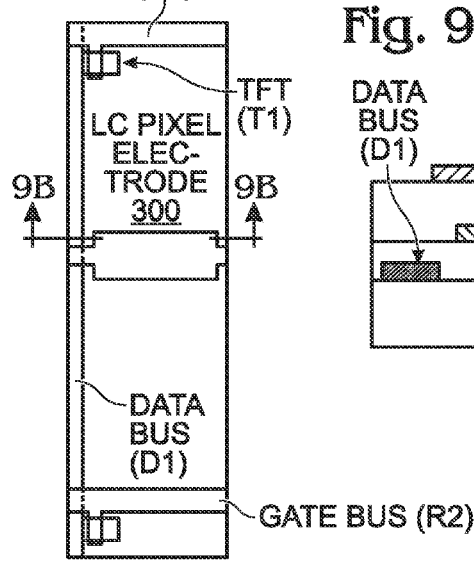
FIGS. 9A and 9B are, respectively, plan and partial cross-sectional views of a storage capacitor/piezoelectric transducer fabricated on a busline.
Figure 9B:
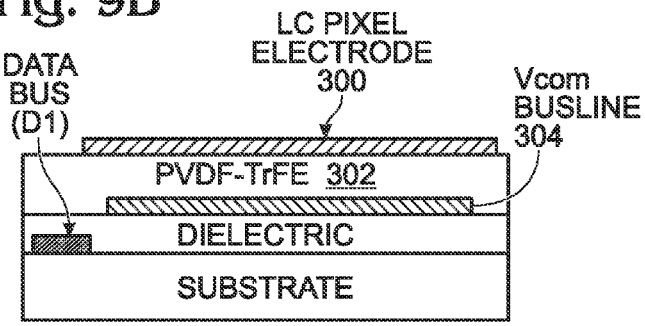

FIGS. 9A and 9B are respectively, plan and partial cross-sectional views of a storage capacitor/piezoelectric transducer fabricated on a busline. By simple modifications of the conventional process flow, it is possible to substitute a piezoelectric material for a conventional storage capacitor dielectric layer. PVDF-TrFE, for example, has a relative permittivity of 7.5, as compared with 3.9 for $SiO_2$, and the dielectric strength is 0.3 MV/cm, as compared with 10 MV/cm for $SiO_2$. The new deposition process to make the PVDF-TrFE ultrasonic sensor is as follows:

1) Prepare the bottom electrode by the appropriate etch and cleaning processes;
2) Coat the surface with an ink of PVDF-TrFE copolymer dissolved in a solvent such as tetrahydrofuran (THF) or N,N-dimethylformamide (DMF);
3) Bake at a low temperature such as 90° C. to evaporate the solvent;
4) Anneal the resulting PVDF-TrFE film to crystallize. Typically at 130° C. for one hour;
5) In a vacuum chamber apply a high field perpendicular to the surface of the PVDF-TrFE film to orient the ferroelectric domains. This process is referred to as poling;
6) Deposit and pattern the transparent conductive electrode for the LC pixel.

Although not explicitly shown, it is clear that a standard storage capacitor can be used in addition to the piezoelectric capacitor (storage capacitor/piezoelectric transducer) in order to change the ratio between video voltage and the magnitude of the ultrasonic response.

Figure 10:
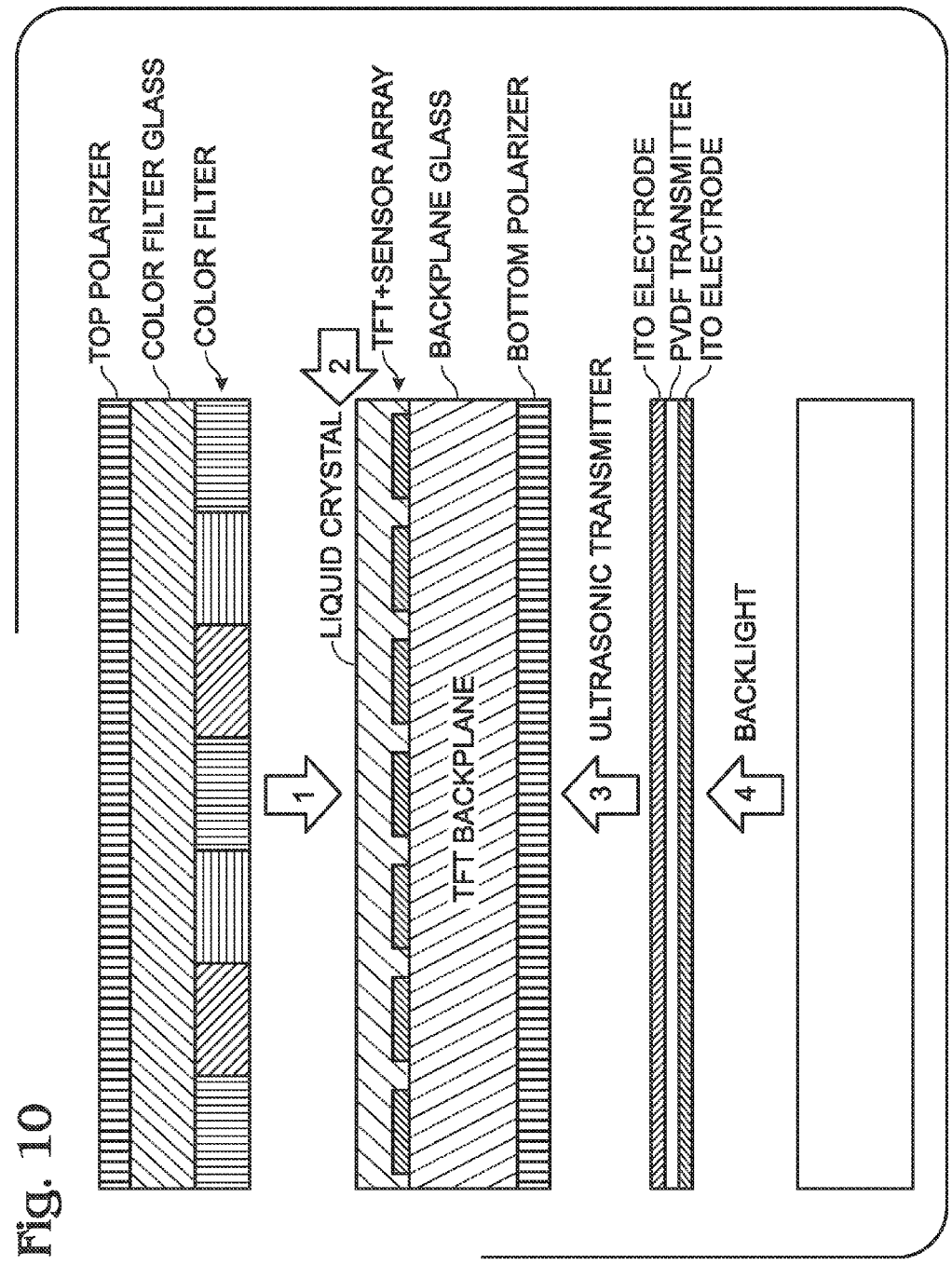
FIG. 10 is a partial cross-sectional view depicting the assembly order of an LCD display with an integrated ultrasonic touch sensor and piezoelectric transmitter.

FIG. 10 is a partial cross-sectional view depicting the assembly order of an LCD display with an integrated ultrasonic touch sensor and piezoelectric transmitter. Once the ultrasonic sensor fabrication is complete, assembly of the LCD display panel can continue in the normal fashion. As shown in the figure, the TFT backplane is bonded to the color filter module to encapsulate LC material between the two modules, and a polarizer is attached to the back of the backplane glass. After completion of the display, a planar ultrasonic transducer is formed of two transparent conductive electrodes and a layer of PVDF, which is attached to the back surface of the display module to transmit the ultrasonic pulses used to detect touch on the front surface. Finally, the display is completed by attaching the backlight module. It should be noted that the ultrasonic transmitter could be incorporated at other places in the display stack, for example, on the back of the backlight, or before the bottom polarizer is attached, or as a part of the color filter module. In each case there are tradeoffs between cost and performance, and the timing between transmitting a pulse and sensing must be adapted to the ultrasonic pulse transit time. For example, positioning the transmitter on the backlight assembly allows the use of standard metals for the transducer because the transmitter does not need to be transparent in this position. However, backlight assemblies typically have air gaps that reflect a significant amount of ultrasonic energy, so the transmitter would require more ultrasonic power at lower frequencies, which would limit resolution and decrease battery life.

Figure 11:
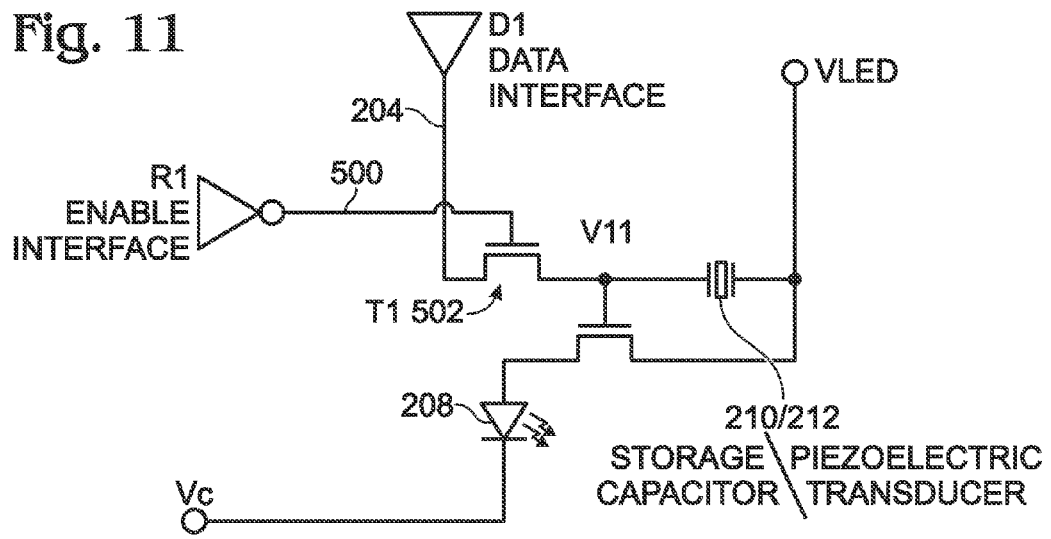
FIG. 11 is a schematic depicting a single pixel circuit for an OLED display with the piezoelectric transducer included.

FIG. 11 is a schematic depicting a single pixel circuit for an OLED display with the piezoelectric transducer included. It is clear that other display technologies that use a storage capacitor to set a voltage, which in turn controls the light intensity at a pixel, can also use this ultrasonic technology by the simple means of replacing the standard dielectric layer in the storage capacitor with the piezoelectric PVDF-TrFE material. The voltage on the storage capacitor with respect to VLED is the piezoelectric response to a front surface touch, plus the display control voltage set prior to the ultrasonic pulse.

Figure 12A:
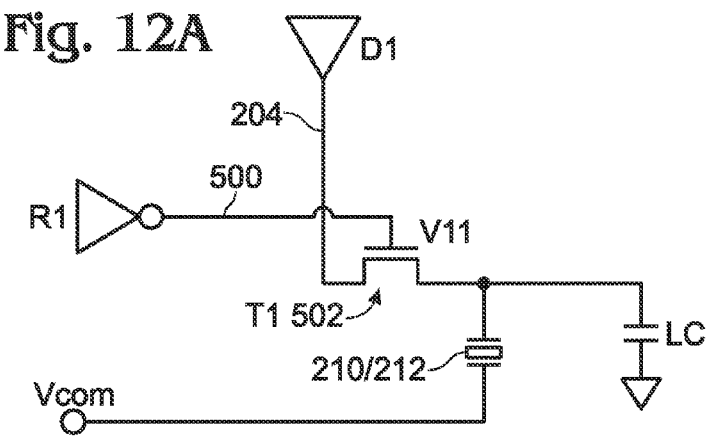
FIG. 12A is a schematic diagram of an LCD display pixel with the piezoelectric transducer integrated in the storage capacitor.
Figure 12B:
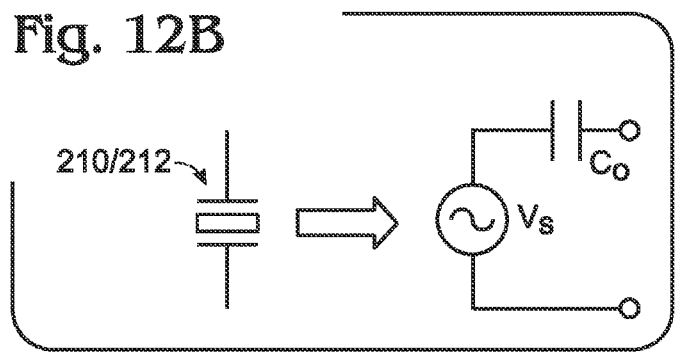
FIG. 12B represents an equivalent circuit for the storage capacitor/piezoelectric transducer.
Figure 23A:
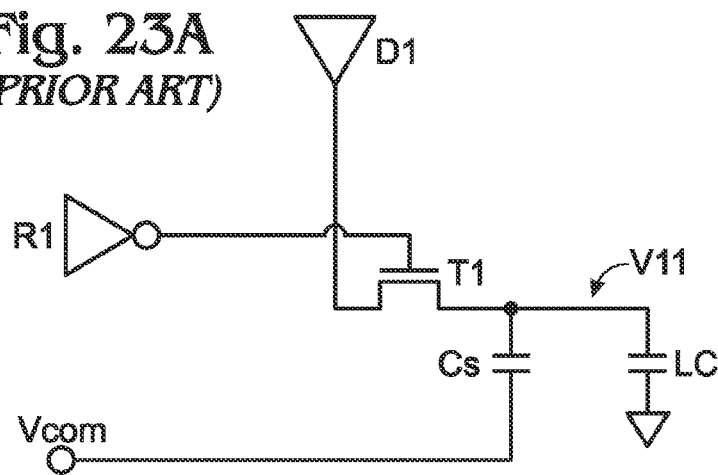
FIG. 23A is a schematic and FIG. 23B depicts two possible circuit layouts associated with the schematic (prior art).

FIG. 12A is a schematic diagram of an LCD display pixel with the piezoelectric transducer integrated in the storage capacitor, and FIG. 12B represents an equivalent circuit for the storage capacitor/piezoelectric transducer. In contrast to the circuit of FIG. 23A, the inclusion of the piezoelectric layer in the storage capacitor changes the circuit, so that the storage capacitor/piezoelectric transducer 210/212 can be represented by the equivalent circuit of a voltage source and capacitor connected in series. The area of the capacitor and thickness of the PVDF-TrFE film must be set to produce the correct storage capacitance Co for LC function. Here, the LC layer light device is represented as a capacitor. However, it should be understood that the control electrode of the LC layer and top electrode of the storage capacitor/piezoelectric transducer are the same. In this circuit the voltage source (Vs) of the piezoelectric layer changes the voltage at the node V11 if ultrasonic energy is absorbed by the storage capacitor/piezoelectric transducer. Thus, by adding a voltage read function to the external circuitry attached to data lines, it is possible to determine whether an object is in contact with the display surface at a specific pixel. It is clear that other display technologies may incorporate the same strategy for touch sensing by adding the piezoelectric sensing function to the storage capacitor at each display node.

Figure 13:
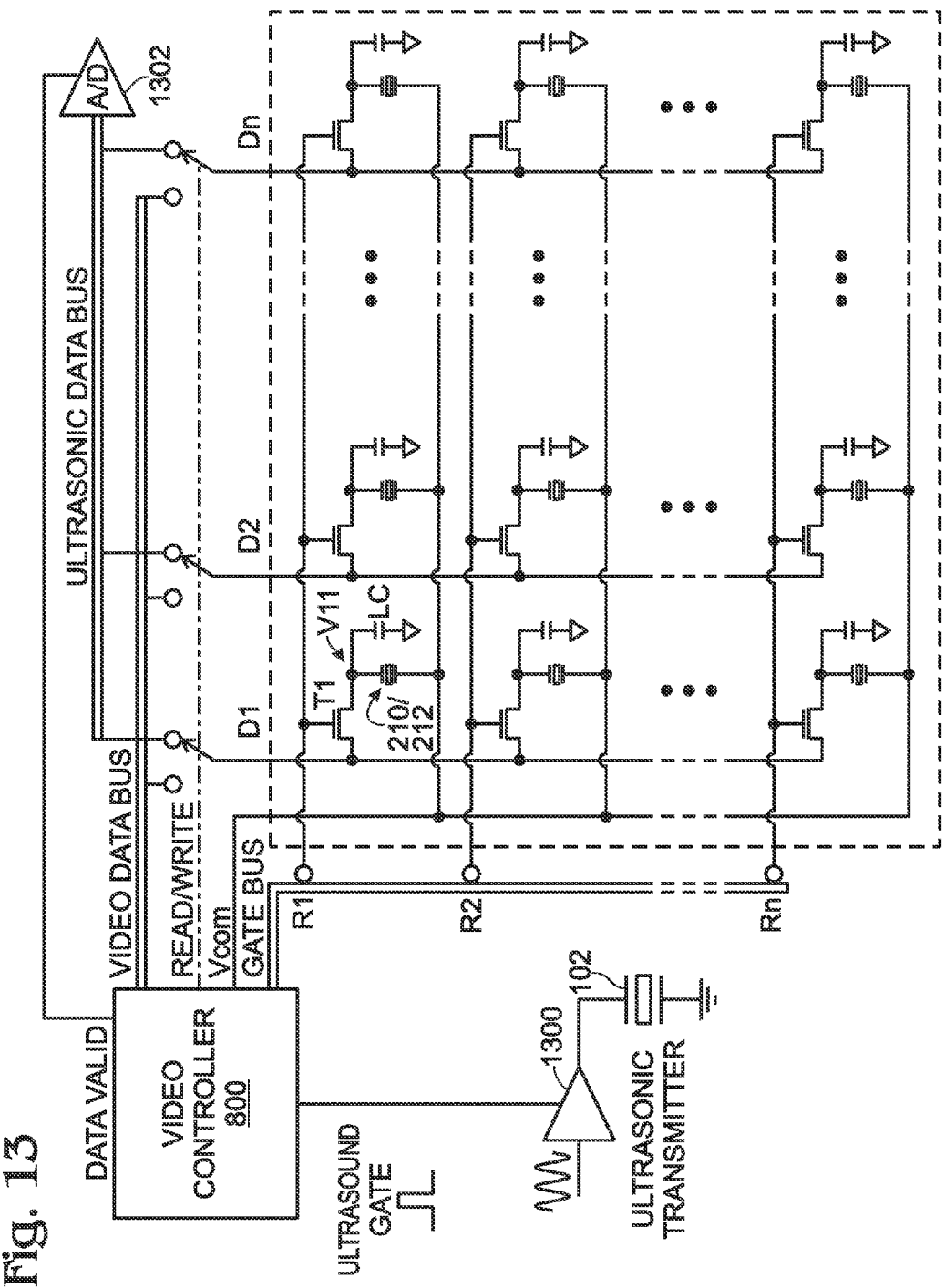
FIG. 13 is a schematic block diagram of an LCD display array with integrated ultrasonic touch sensing.

FIG. 13 is a schematic block diagram of an LCD display array with integrated ultrasonic touch sensing. This figure adds the components for the integrated ultrasonic touch sensor to the full array schematic introduced in FIG. 1. The added components external to the display panel are:

1) The ultrasonic transmitter, which consists of a signal source (e.g. 1 to 50 MHz) and a gated power amplifier 1300 to drive the ultrasonic plane-wave transducer 102 attached to the display panel. This component transmits a short chirp of ultrasound through the display.
2) A column multiplexer (controller) 800 that selects between the input of video signals (write) and the output of voltages for the measurement of the ultrasonic response (read).
3) An analog-to-digital (A/D) converter 1302 that may also have instrument amplifiers, filters, and so forth (not shown), which converts the analog voltage on each pixel storage node to a digital value that can be evaluated by a microcontroller, field programmable gate array (FPGA), or computer to determine the presence or absence of a touch.

Here the video control circuitry (controller) 800 generates the timing and video data signals to operate the array. In addition to the video signals (D1 to Dn), the gate control (enable) signals (R1 to Rn), and Vcon of the prior art, there are new control signals that may be used for the ultrasonic touch panel as follows:

1) A signal to select between reading the voltage on a pixel and writing a new video setting to the pixel (Read/write);
2) A signal to control the start and width of the ultrasonic pulse sent by the transmitter (ultrasound pulse); and,
3) A signal to start the A/D conversion of the voltage on the ultrasonic data lines (data valid).

Figure 14:
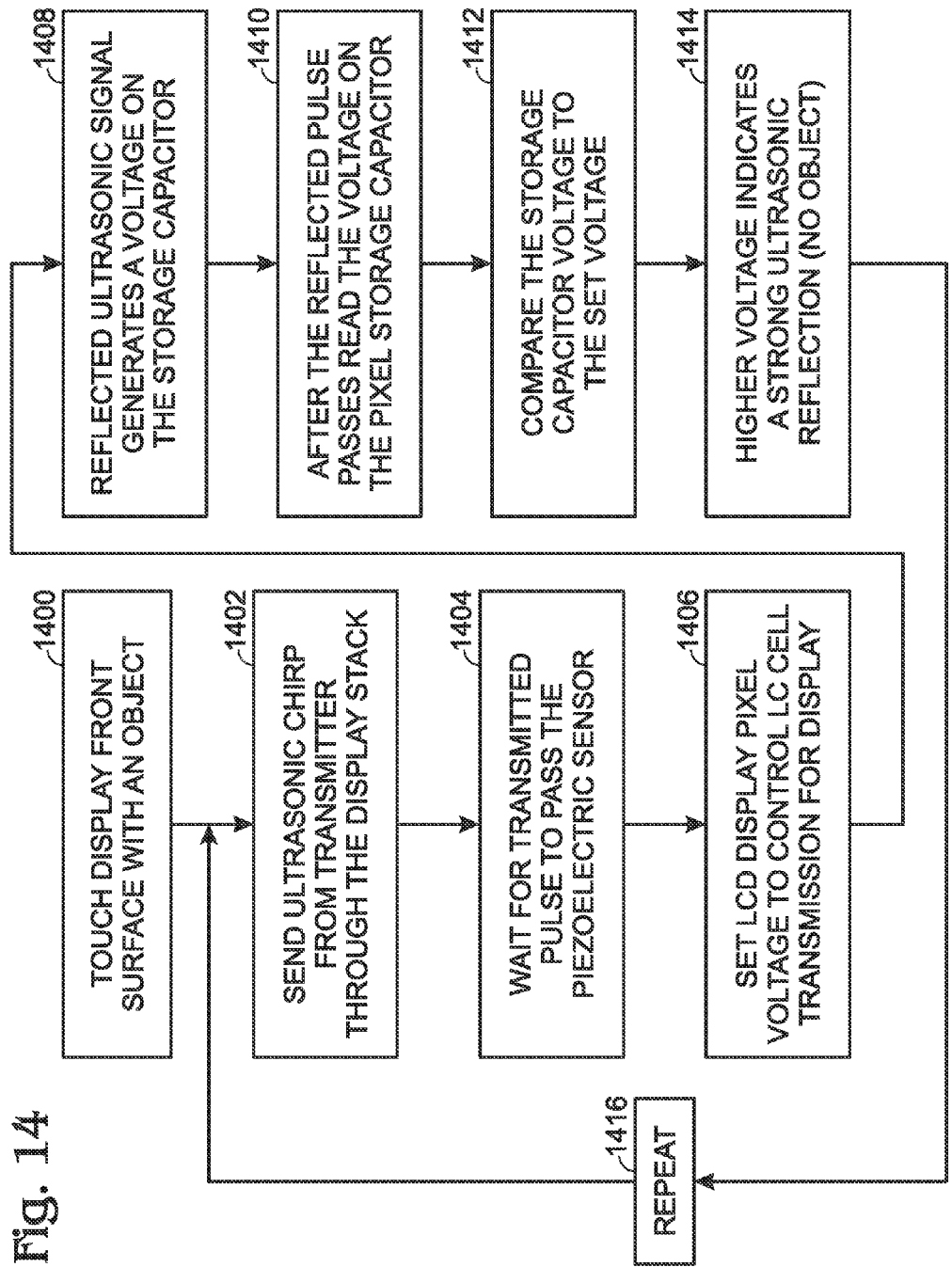
FIG. 14 is an Operation flow chart for the integrated ultrasonic touch sensor of FIG. 13.

FIG. 14 is an operation flow chart for the integrated ultrasonic touch sensor of FIG. 13. Using the configuration of FIG. 13, the operation of the display and touch sensor would be as shown in the flow diagram. In Step 1400 an object touches the display panel front surface. In Step 1402 an ultrasonic signal is transmitted. Step 1404 represents a delay. In Step 1406 the video signals are written to the pixels. In Step 1408 the reflected ultrasonic generates a touch signal voltage. In Step 1410 the touch signals are read. In Step 1412 the touch signal voltage is compared to the video signal voltage. In Step 1414 a touch is determined, and Step 1416 represents a repetition of the process.

Figure 15:
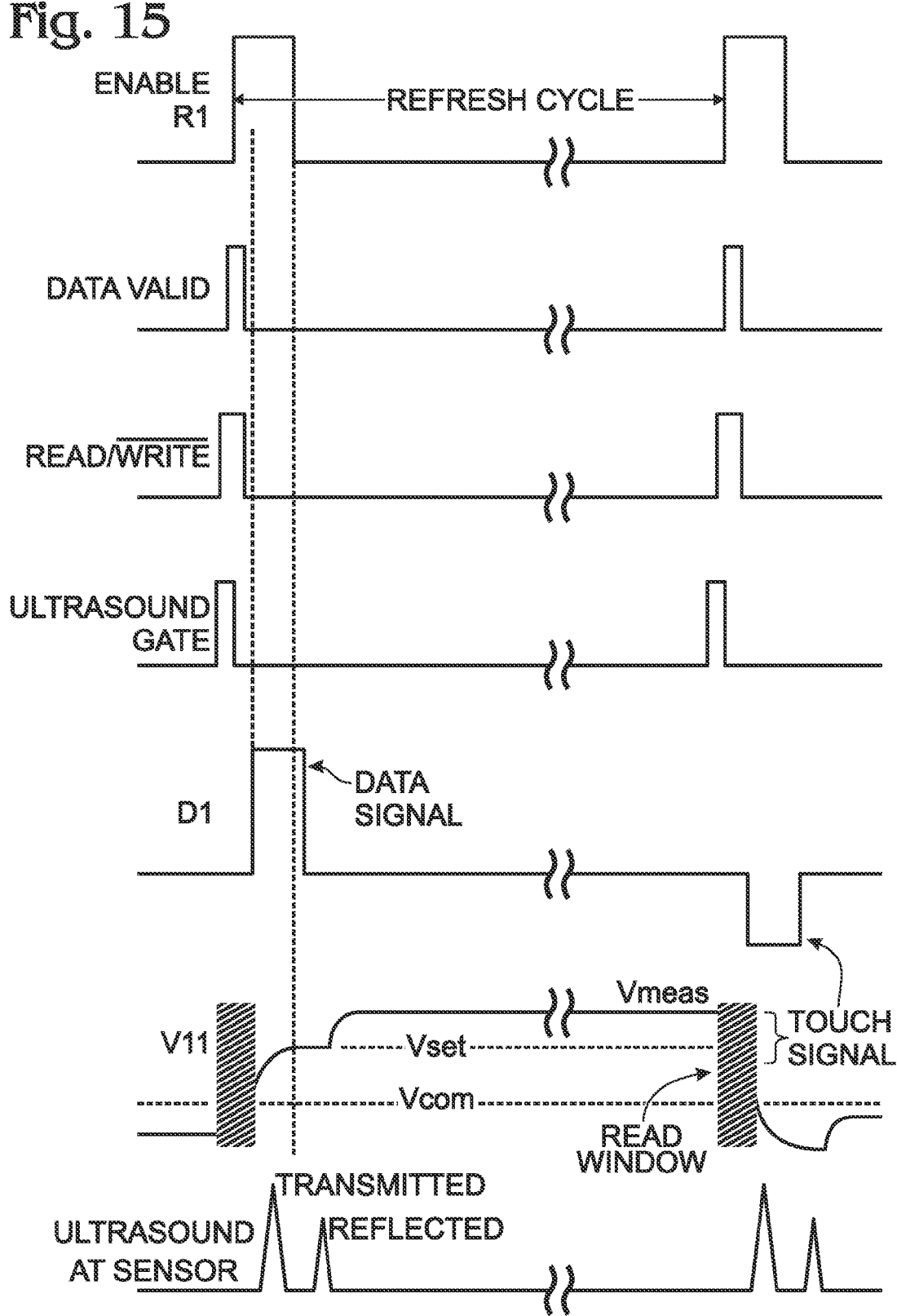
FIG. 15 is an exemplary timing diagram for the integrated ultrasonic touch sensor of FIG. 13, showing the operation of the single pixel at row 1 column 1, including the switching between read and write functions.
Figure 21:
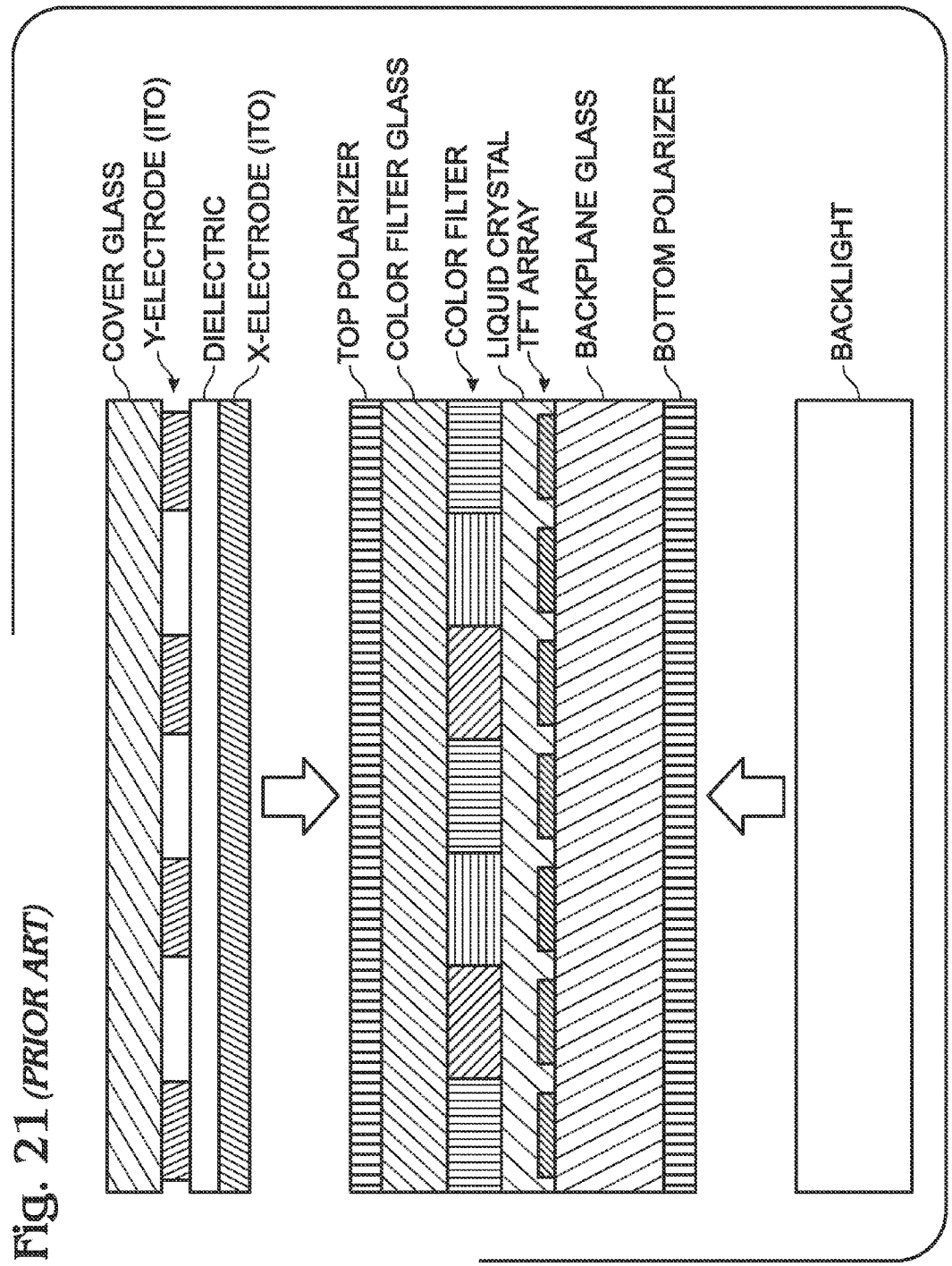
FIG. 21 is a partial cross-sectional view of a LCD panel with a projective capacitance touch sensor (prior art).
Figure 22A:
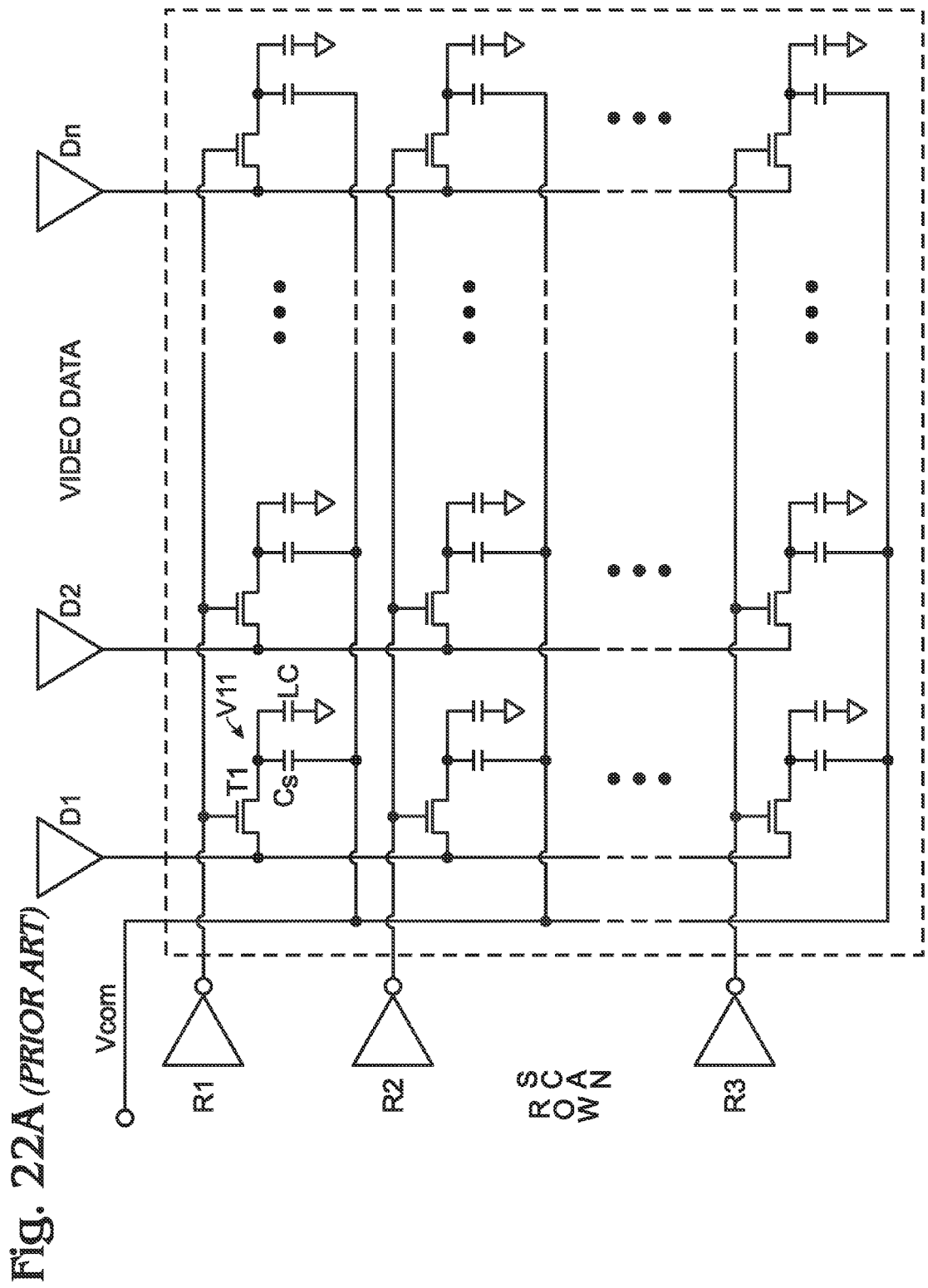
FIGS. 22A and 22B are schematic and timing diagrams, respectively, for an LCD display TFT backplane (prior art).
Figure 22B:
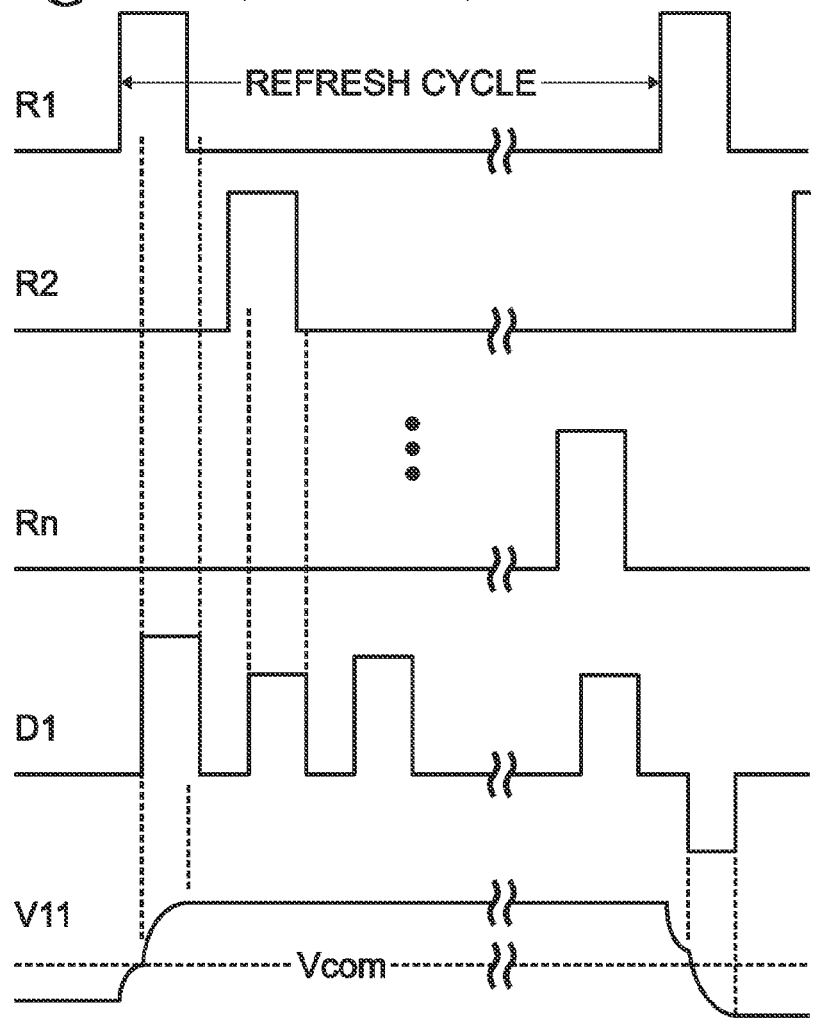
Figure 23B:
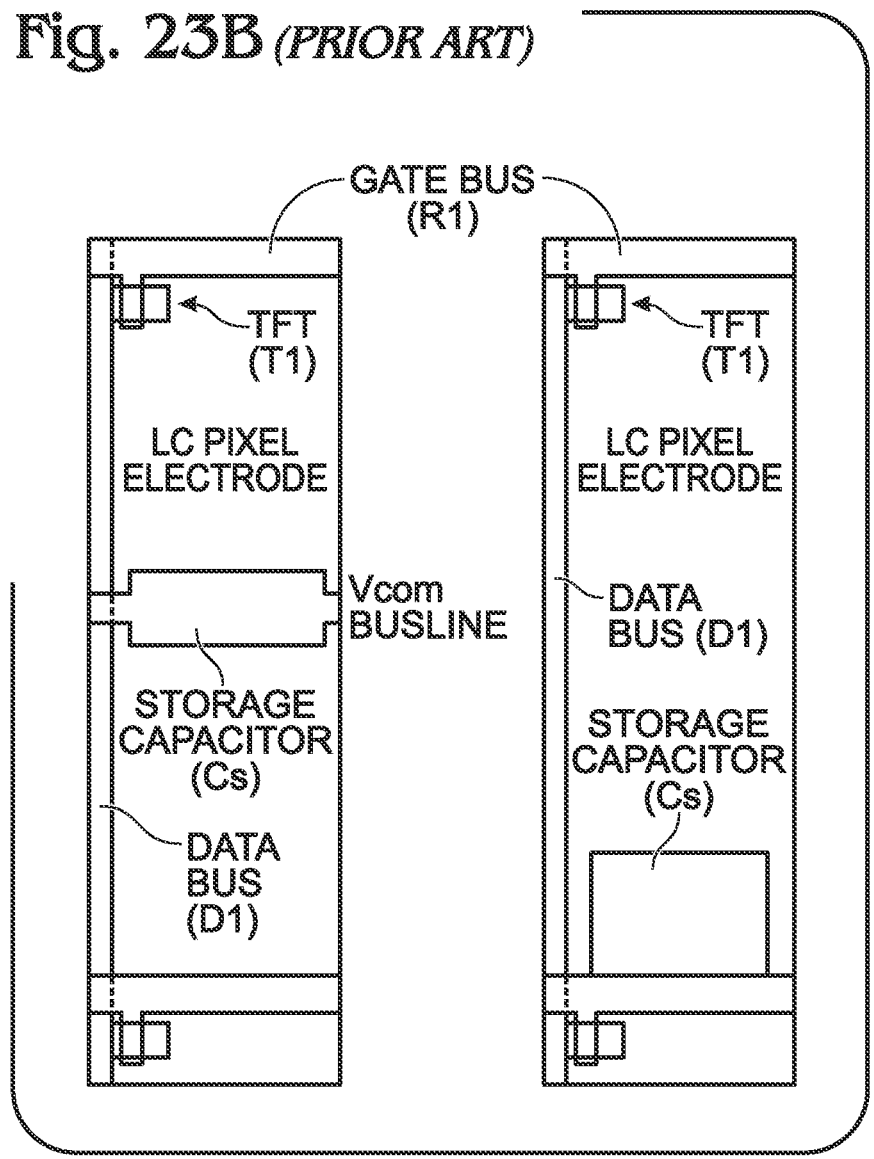

FIG. 15 is an exemplary timing diagram for the integrated ultrasonic touch sensor of FIG. 13, showing the operation of the single pixel at row 1 column 1, including the switching between read and write functions. In summary, a Read/Write signal selects the data path for reading the voltage on the LCD pixel, and a data valid signal initiates analog to digital conversion of the voltage on the data lines for each pixel in Row 1. After the Read/Write signal connects the video controller to the data lines, the voltage at each pixel is set to produce the desired video image. It is clear to someone skilled in the art that the simple timing diagram can be extended to more complex multiplexing schemes to decrease the number of A/D converters and data drivers required. It is important to note that the transmitted pulse also causes a response in the storage capacitor. In the case of the sample timing diagram the display voltage is set after the transmitted pulse passes the piezoelectric sensor layer, and the pixel TFT is turned off before the reflected pulse returns to the sensor. Thus, measurement of the transmitted pulse is avoided but the reflected pulse is measured by the piezoelectric sensor. This restriction on timing is not strictly necessary and the transmit pulse could be sent at any time so long as the reflected pulse arrives at the sensor before reading. However in that case, disturbance of the video signal by the ultrasonic response is increased. The standard practice of using opposite bias with respect to Vcon on successive refresh cycles, as shown in FIGS. 23B and 15, causes the video disturbance by the piezoelectric response of the sensor to be averaged out.

Alternatively, a reduced duty cycle may be used where an ultrasonic pulse is applied only every X video refresh cycles. So for a 240 frames per second (fps) refresh, a touch cycle may be once every 60 cycles or every 0.25 sec. Then, the effect of the piezoelectric response on the video would only be noticed at reduced rates set by duty cycle. In addition, the screen may be set dark for the ultrasonic pulse cycle, so if there is no touch, the uniform echo causes an increase of brightness for all pixels uniformly. If there is a touch, the difference is under the touch object.

FIG. 16 is a schematic diagram of a variation to the pixel design presented in FIG. 13. This design minimizes the disturbance of the piezoelectric response to the voltage that controls the video intensity displayed by the pixel. In this case, the touch sensor is integrated in the conventional amorphous-Si or polycrystalline-Si active-matrix TFT LCD array. The circuit comprises TFT $T_1$ 502, storage capacitor $C_S$ 210, liquid-crystal equivalent capacitor $C_{LC}$ 208, and piezoelectric transducer (capacitive sensor) $C_P$ 212. One electrode of piezoelectric transducer $C_P$ 212 is connected to the drain of $T_1$. The other electrode of $C_P$ 212 is connected to a common line. The latter is attached to a common voltage or left at high impedance, depending on the operation of switch $SW_2$ 1602. When $SW_2$ 1602 is at point b, the common line is at high impedance. When $SW_2$ 1602 is at point a, the common line is at potential $V_{COM}$. Switch $SW_2$ 1602 may be realized with as a TFT switch, and its design is known to someone skilled in the art.

The drain of $T_1$ 502 is also connected to switch $SW_1$ 1604. This switch can be connected to source $V_{DATA}$ (video signal), identical to the data driver circuitry of conventional LCD arrays, or to a read-out line into a charge integrator 1606 or similar circuit that samples the charge (touch signal) stored in $C_P$ 212 and/or the voltage at the drain of $T_1$ 502. Switch $SW_1$ 1604 may also be realized with a TFT switch.

FIG. 17 is a timing diagram associated with the circuit of FIG. 16. As soon as the new value of data is available ($V_{DATA}$), the gate (enable) signal $V_{GATE}$ is activated at time $t_1$, turning transistor $T_1$ on. During this time, switch $SW_2$ of the common line holds the line at a high impedance, so piezoelectric transducer $C_P$ does not interfere with data writing in the array. In response to the gate signal $V_{GATE}$ turning on at time $t_1$, new data is written to the pixel, and the voltage $V_{CLC}$ of capacitor $C_{LC}$ is settles to its new value. At time $t_2$, switch $SW_1$ disconnects the drain of $T_1$ from the data line, and either sets at high impedance, or as shown in FIG. 16, connects to the read-out circuitry.

Following this, the ultrasonic pulse is emitted at time $t_3$. In response to the emission of the pulse, the voltage $V_{CP}$ across piezoelectric transducer $C_P$ adjusts to a new value at $t4$ in response to the reflected ultrasonic energy. $C_P$ cannot discharge, since switch $SW_2$ is holding the common line at high impedance, and transistor $T_1$ is off.

At time $t_4$, switch $SW_2$ closes, and connects the common line to a constant voltage. This closes a circuit comprised of the common line, the read-out circuitry, and piezoelectric transducer $C_P$, enabling the latter to discharge and the read-out circuitry to read a value $V_{OUT}$, proportional to the voltage or charge of $C_P$.

FIG. 18 is a diagram depicting an exemplary integration of the circuit of FIG. 17 into an LCD display. Switches $SW_{1A}$ 1604a, $SW_{1B}$ 1604b, etc., are either integrated on the glass panel of the display, or realized as separate chips. The same is true for common-line switches $SW_{2A}$ 1602a, $SW_{2B}$ 1602b, etc.

FIG. 19 is a flowchart illustrating a method for operating a touch-sensitive video display pixel. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1900.

In Step 1902 a video display pixel accepts a video signal voltage at a periodic refresh cycle rate. Step 1904 maintains the video signal voltage between refresh cycles. In Step 1906 the video display pixel supplies light with an intensity responsive to the video signal voltage. Step 1908 accepts a reflected ultrasonic signal. Step 1910 maintains a touch signal voltage derived from a reflected ultrasonic signal energy. In Step 1912 the video display pixel supplies the touch signal voltage at the refresh cycle rate. Step 1914 determines a proximately located object (i.e. a touch of the pixel) in response to comparing the touch signal voltage to the video signal voltage.

In one aspect, maintaining the video signal voltage in Step 1904 and maintaining the touch signal voltage in Step 1910 includes maintaining both the video signal voltage and touch signal voltage using a common piezoelectric transducer/storage capacitor. In another aspect, accepting the video signal voltage in Step 1902 and supplying the touch signal voltage in Step 1912 includes accepting the video signal voltage and supplying the touch signal voltage via a common interface.

FIG. 20 is a flowchart illustrating method for operating a touch-sensitive video display. The method begins at Step 2000. In Step 2002 a planar piezoelectric transmitter transmits ultrasound signals towards a display front surface. In Step 2004 each pixel in a video display panel underlying the front surface and including a plurality of pixels, is selectively enabled to accept a video signal voltage at a periodic refresh cycle rate. In Step 2006 each pixel maintains the video signal voltage between refresh cycles. In Step 2008 each pixel supplies light with an intensity responsive to the video signal voltage. In Step 2010 each pixel accepts a reflected ultrasonic signal. In Step 2012 each pixel maintains a touch signal voltage derived from a reflected ultrasonic signal energy. In Step 2014 each pixel is selectively enabled to supply the touch signal. voltage at the refresh cycle rate. Step 2016 determines an object proximately located to the display front surface in response to comparing the touch signal voltage to the video signal voltage for each pixel.

In one aspect, maintaining the video signal voltage in Step 2006 and maintaining the touch signal voltage in Step 2012 includes each pixel maintaining both the video signal voltage and touch signal voltage using a common piezoelectric transducer/storage capacitor. In another aspect, accepting the video signal voltage in Step 2004 and supplying the touch signal voltage in Step 2012 includes each pixel accepting the video signal voltage and supplying the touch signal voltage via a common interface.

A system and method have been provided for integrating a touch sensor directly into the pixels of a display. Examples of particular display types, circuit designs, and timing schemes have been presented to illustrate the invention. However, the invention is not limited to merely these examples. Although primarily described in the context of a backlit LCD panels, the ultrasonic sensor device can also be fabricated in reflective display panel. Further, the touch sensor may be incorporated into plasmonic displays to transmit backlit or reflective light, or MEMS displays that use pixel shutters to control light transmission. Other variations and embodiments of the invention will occur to those skilled in the art.

We claim:
1. A video display pixel with ultrasonic touch sensor, pixel comprising:
a data interface periodically enabled to accept a video signal with a variable voltage, and periodically enabled to supply a touch signal;
a light device to supply light with an intensity responsive to the video signal voltage;
a storage capacitor connected to the data interface and the light device to maintain the video signal voltage for a first period of time; and, a piezoelectric transducer to accept a reflected ultrasonic signal with a variable energy and to supply the touch signal with a variable voltage derived from the energy of the ultrasonic signal.

2. The pixel of claim 1 wherein the storage capacitor and the piezoelectric transducer are the same device, the piezoelectric transducer/storage capacitor comprising:
a conductive bottom electrode;
a piezoelectric layer overlying the conductive bottom electrode; and,
a transparent conductive top electrode overlying the piezoelectric layer.

3. The pixel of claim 2 wherein the piezoelectric layer is selected from a group consisting of a co-polymer of polyvinylidenefluoride and trifluoroethylene (PVDF-TrFE), and PVDF.

4. The pixel of claim 2 wherein the light device includes a liquid crystal (LC) layer interposed between electrodes; and,
wherein the piezoelectric transducer/storage capacitor top electrode and a control electrode of the light device are the same electrode.

5. The pixel of claim 2 further comprising:
an enable interface; and,
a first switch having a terminal connected to the data interface, a terminal connected to the piezoelectric transducer/storage capacitor, and a control port connected to the enable interface to selectively enable the first switch.

6. The pixel of claim 2 wherein the light device is a light emitting diode (LED).

7. The pixel of claim 6 further comprising:
an enable interface; and,
a first switch having a first terminal connected to the data interface, a second terminal connected to the piezoelectric transducer, and a control port connected to the enable interface to selectively enable the first switch;
a first thin film transistor (TFT) having a gate connected to the second terminal of the first switch, a source, and a drain; and,
wherein the LED has a cathode connected to the source of the first TFT.

8. The pixel of claim 1 further comprising:
an enable interface; and,
a first switch having a terminal connected to the data interface and the piezoelectric transducer, a control port connected to the enable interface to selectively enable the first switch, and a terminal connected to the storage capacitor and light device.

9. A video display comprising:
a planar piezoelectric transmitter to transmit ultrasound signals: and,
a display panel including a plurality of pixels, each pixel having a data interface to accept a video signal with a variable voltage associated with a range of light intensity values, and to supply a touch signal with a variable voltage derived from a range of reflected ultrasound signal energies.

10. The display of claim 9 wherein each pixel comprises:
a light device to supply light with an intensity responsive to the video signal voltage;
a storage capacitor to maintain a video signal voltage between refresh cycles; and,
a piezoelectric transducer to accept a reflected ultrasound signal energy and to maintain a touch signal voltage between refresh cycles.

11. The display of claim 10 wherein the storage capacitor and the piezoelectric transducer are the same device, the piezoelectric transducer/storage capacitor comprising:
a conductive bottom electrode;
a piezoelectric layer overlying the conductive bottom electrode; and,
a transparent conductive top electrode overlying the piezoelectric layer.

12. The display of claim 11 wherein the piezoelectric layer is selected from a group consisting of a co-polymer of polyvinylidenefluoride and trifluoroethylene (PVDF-TrFE), and PVDF.

13. The display of claim 11 wherein the light device is a liquid crystal (LC) layer interposed between electrodes; and,
wherein the piezoelectric transducer/storage capacitor top electrode and a control electrode of the light device are the same electrode.

14. The display of claim 11 wherein each pixel further comprises:
an enable interface; and,
a first switch having a terminal connected to the data interface, a terminal connected to the piezoelectric transducer/storage capacitor transparent top electrode, and a control port connected to the enable interface to selectively enable the first switch.

15. The display of claim 11 wherein the light device is a light emitting diode (LED).

16. The display of claim 15 wherein each pixel further comprises:
an enable interface; and,
a first switch having a first terminal connected to the data interface, a second terminal connected to the storage capacitor/piezoelectric transducer transparent top electrode, and a control port connected to the enable interface to selectively enable the first switch;
a first thin film transistor (TFT) having a gate connected to the second terminal of the first switch, a source, and a drain; and,
wherein the LED has a cathode connected to the source of the first TFT.

17. The display of claim 10 wherein the storage capacitor comprises a dielectric layer interposed between a bottom electrode and a transparent top electrode;
wherein the piezoelectric transducer comprises a piezoelectric layer interposed between a bottom electrode and a transparent top electrode;
wherein each pixel further comprises:
an enable interface; and,
a first switch having a terminal connected to the data interface and the piezoelectric transducer top electrode, a control port connected to the enable interface to selectively enable the first switch, and a terminal connected to the storage capacitor top electrode and light device.

18. The display of claim 9 further comprising:
a controller comprising:
a video data bus output to supply video signals;
a touch signal data bus input to accept touch signals;
a control signal bus output to supply a switch control signal; and,
a plurality of switches, each switch having a first terminal connected to the data interface of a corresponding pixel, a second terminal selectively engagable, to a bus selected from a group consisting of the video data bus output and the touch signal data bus input, in response to a switch control signal, and a control signal interface connected to the switch control signal bus.

19. The display of claim 18 wherein the controller further comprises an enable bus output connected to the plurality of pixels to supply an enable signal; and,
    wherein the data interfaces of a plurality of pixels are enabled in response to the enable signal.

20. A method for operating a touch-sensitive video display pixel, the method comprising:
    a video display pixel accepting a video signal voltage at a periodic refresh cycle rate;
    maintaining the video signal voltage between refresh cycles;
    the video display pixel supplying light with an intensity responsive to the video signal voltage;
    accepting a reflected ultrasonic signal;
    maintaining a touch signal voltage derived from a reflected ultrasonic signal energy; and
    the video display pixel supplying the touch signal voltage at the refresh cycle rate.

21. The method of claim 20 wherein maintaining the video signal voltage and maintaining the touch signal voltage includes maintaining both the video signal voltage and touch signal voltage using a common piezoelectric transducer/storage capacitor.

22. The method of claim 20 wherein accepting the video signal voltage and supplying the touch signal voltage includes accepting the video signal voltage and supplying the touch signal voltage via a common interface.

23. The method of claim 20 further comprising:
    determining a proximately located object in response to comparing the touch signal voltage to the video signal voltage.

24. A method for operating a touch-sensitive video display, the method comprising:
    a planar piezoelectric transmitter transmitting ultrasound signals towards a display front surface;
    each pixel in a video display panel underlying the front surface and including a plurality of pixels, being selectively enabled to accept a video signal voltage at a periodic refresh cycle rate;
    each pixel maintaining the video signal voltage between refresh cycles;
    each pixel supplying light with an intensity responsive to the video signal voltage;
    each pixel accepting a reflected ultrasonic signal;
    each pixel maintaining a touch signal voltage derived from a reflected ultrasonic signal energy; and
    each pixel selectively enabled to supply the touch signal voltage at the refresh cycle rate.

25. The method of claim 24 wherein maintaining the video signal voltage and maintaining the touch signal voltage includes each pixel maintaining both the video signal voltage and touch signal voltage using a common piezoelectric transducer/storage capacitor.

26. The method of claim 24 wherein accepting the video signal voltage and supplying the touch signal voltage includes each pixel accepting the video signal voltage and supplying the touch signal voltage via a common interface.

27. The method of claim 24 further comprising:
    determining an object proximately located to the display front surface in response to comparing the touch signal voltage to the video signal voltage for each pixel.

* * * * *